United States Patent
Tatsumi

(10) Patent No.: US 10,380,725 B2
(45) Date of Patent: Aug. 13, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Eisaku Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 15/353,158

(22) Filed: Nov. 16, 2016

(65) Prior Publication Data

US 2017/0154412 A1 Jun. 1, 2017

(30) Foreign Application Priority Data

Nov. 26, 2015 (JP) .................................. 2015-231015

(51) Int. Cl.
  *G06T 5/00* (2006.01)
  *G06T 5/20* (2006.01)
  (Continued)

(52) U.S. Cl.
  CPC .............. *G06T 5/009* (2013.01); *G06T 5/008* (2013.01); *G06T 5/20* (2013.01); *H04N 5/202* (2013.01);
  (Continued)

(58) Field of Classification Search
  CPC ........... G06T 5/009; G06T 5/008; G06T 5/20; G06T 2207/10024; G06T 2207/20208;
  (Continued)

(56) References Cited

U.S. PATENT DOCUMENTS 5,724,456 A * 3/1998 Boyack .................. G06T 5/009
  345/428
6,493,468 B1 * 12/2002 Matsuura ................ G06T 5/009
  358/521

(Continued)

FOREIGN PATENT DOCUMENTS

| JP | 10-293841 A | 11/1998 |
| JP | 2005-312008 A | 11/2005 |
| JP | 2009-17200 A | 1/2009 |

OTHER PUBLICATIONS

Li Tao and Vijayan Asari, "Adaptive and integrated neighborhood-dependent approach for nonlinear enhancement of color images," Journal of Electronic Imaging, 14(4), 043006 (2005) (Year: 2005).*

*Primary Examiner* — Wesley J Tucker
(74) *Attorney, Agent, or Firm* — Canon U.S.A., Inc. I.P. Division

(57) ABSTRACT

Image processing apparatuses, methods and storage mediums for use therewith are provided herein. At least one image processing apparatus includes, a first acquisition unit configured to, in order to generate a converted image having a narrower dynamic range than an input image, acquire gradation values of a plurality of neighborhood pixels positioned in a predetermined range from a processing target pixel of the input image, a second acquisition unit configured to acquire conversion information from a holding unit holding the conversion information used to generate the converted image having a narrower dynamic range than the input image, and a determination unit configured to determine a gradation value of a pixel on the converted image corresponding to the processing target pixel by using the gradation values of the plurality of neighborhood pixels acquired by the first acquisition unit and the conversion information acquired by the second acquisition unit.

18 Claims, 11 Drawing Sheets

(51) Int. Cl.
*H04N 5/202* (2006.01)
*H04N 5/232* (2006.01)
*H04N 5/235* (2006.01)

(52) U.S. Cl.
CPC ............... *H04N 5/23293* (2013.01); *G06T 2207/10024* (2013.01); *G06T 2207/20208* (2013.01); *H04N 5/2355* (2013.01)

(58) Field of Classification Search
CPC ... H04N 5/202; H04N 5/23293; H04N 5/2355
See application file for complete search history.

(56) References Cited

U.S. PATENT DOCUMENTS

| | | | | |
|---|---|---|---|---|
| 6,717,698 B1* | 4/2004 | Lee | ............... | G06T 5/009 358/1.9 |
| 6,735,330 B1* | 5/2004 | Van Metter | ............ | G06T 5/008 382/132 |
| 7,639,893 B2* | 12/2009 | Duan | ............... | G06T 5/007 345/589 |
| 8,155,474 B2* | 4/2012 | Han | ............... | G06T 5/008 358/521 |
| 2005/0169553 A1* | 8/2005 | Maurer | ............... | G06T 5/008 382/266 |
| 2006/0056684 A1* | 3/2006 | Kurane | ............... | G06T 5/009 382/162 |
| 2006/0120599 A1* | 6/2006 | Steinberg | ............ | G06K 9/0061 382/167 |
| 2007/0171440 A1* | 7/2007 | Yoshida | ............... | G06T 5/009 358/1.9 |
| 2008/0089602 A1* | 4/2008 | Heath | ............... | G06T 5/008 382/274 |
| 2011/0150356 A1* | 6/2011 | Jo | ............... | G06T 5/002 382/269 |
| 2011/0286680 A1* | 11/2011 | Muramatsu | ............ | G06T 5/008 382/255 |
| 2015/0356904 A1* | 12/2015 | Nakatani | ............... | G09G 5/377 345/690 |

* cited by examiner

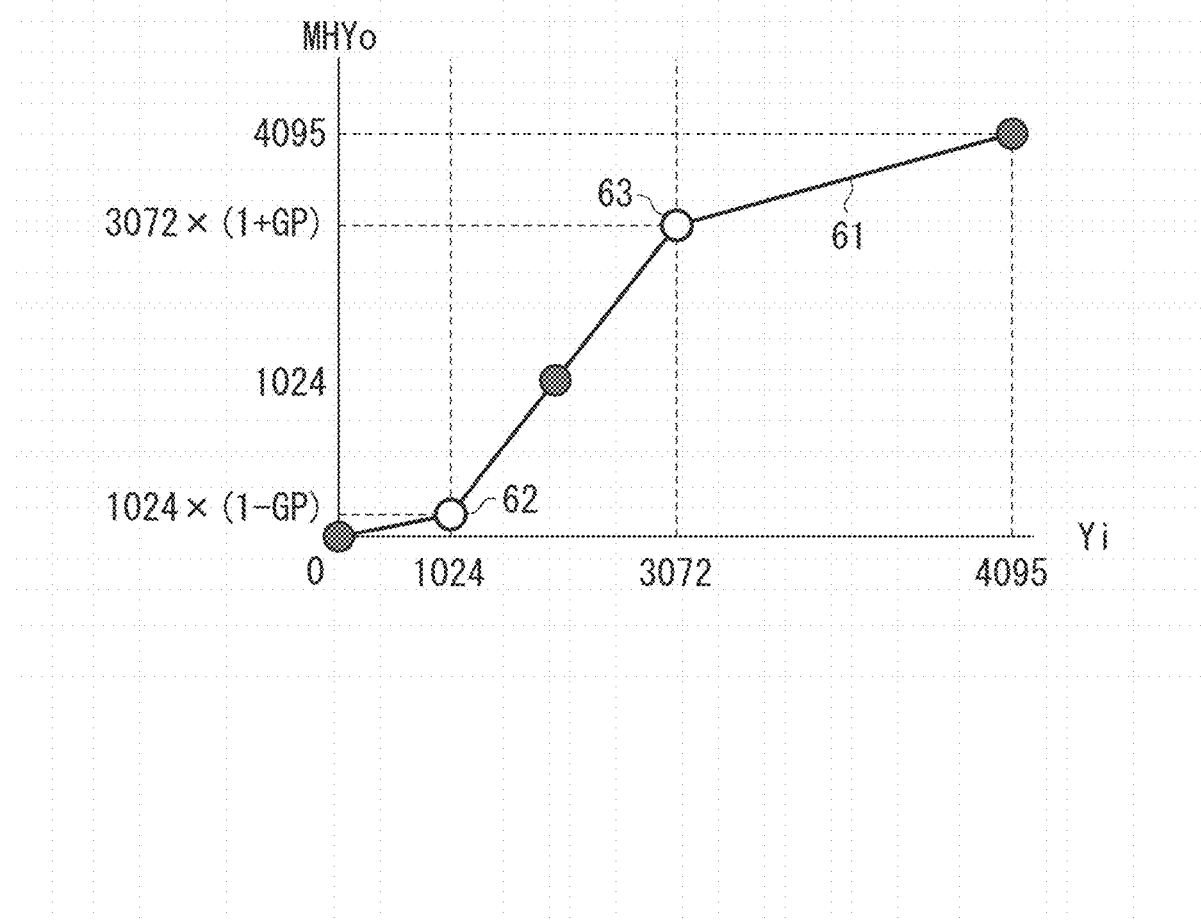

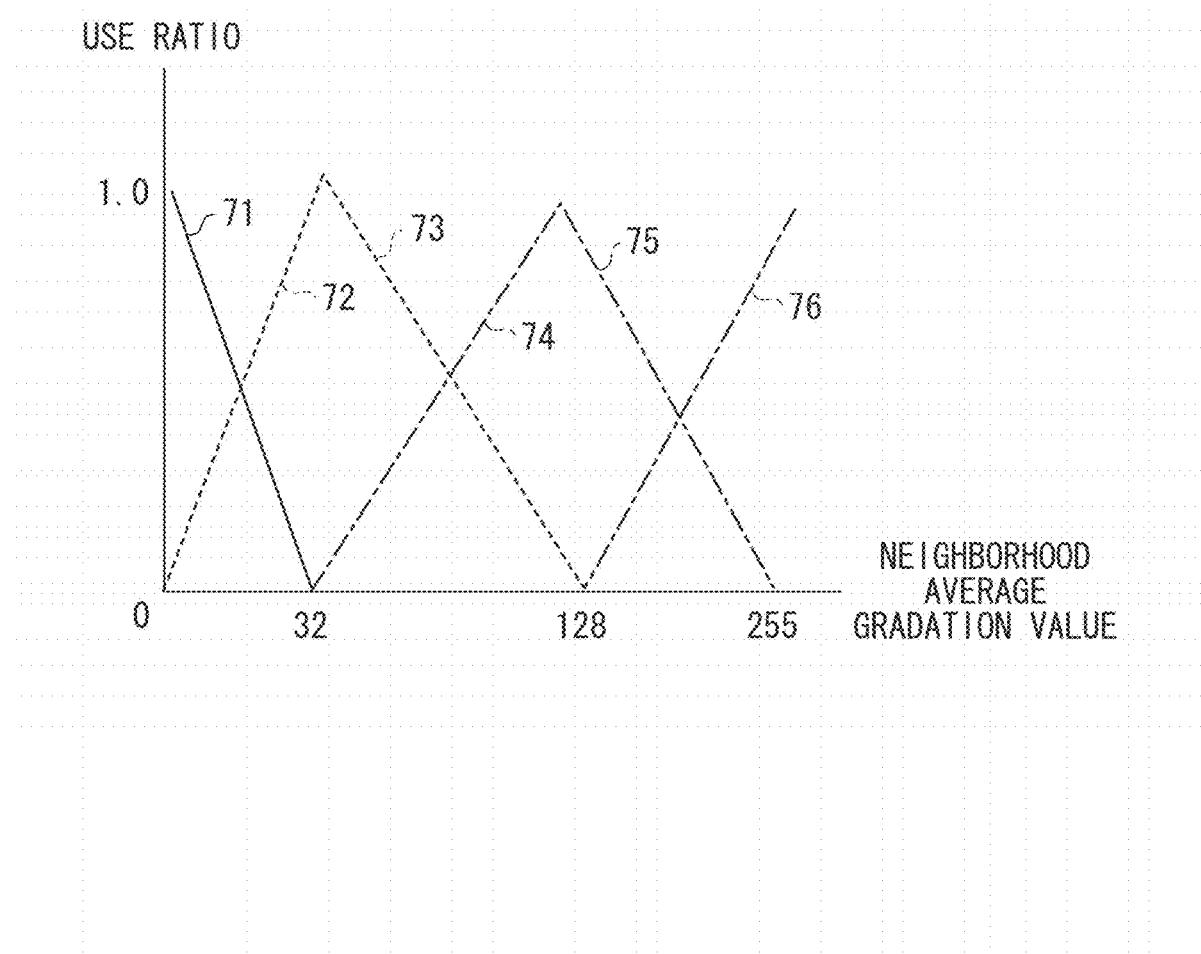

IMAGE PROCESSING APPARATUS, IMAGE PROCESSING METHOD, AND STORAGE MEDIUM

BACKGROUND OF THE INVENTION

Field of the Invention

The present disclosure relates to an image processing apparatus, an image processing method, and a storage medium, and is particularly suitable for being used to improve the image quality of images.

Description of the Related Art

A general video content is generated on an assumption that a display apparatus has a dynamic range of about 2000. However, some display apparatuses actually used for viewing have a narrow dynamic range because of performance restrictions. There is a situation where an assumed content view is not achieved because of the degradation of the dynamic range of a display apparatus due to a bright viewing environment or the degradation of the dynamic range of a projector due to re-reflection of spontaneous light from the side of a viewer. In such a situation, the viewer views a content under degraded contrast conditions. Accordingly, tone curve correction processing is performed. However, there is a possibility that the image quality may be degraded by blown-out highlights and blocked-up shadows as side effects resulting from the raised contrast in an intermediate portion through the tone curve correction processing.

Even if the display apparatus has a wide original dynamic range, the dynamic range of the display apparatus decreases when viewing the display apparatus in a bright environment. Accordingly, gamma correction for raising the contrast may be performed according to an ambient illuminance of the display apparatus. Also in this case, the image quality may be degraded by blown-out highlights and blocked-up shadows similar to the case where the tone curve correction processing is performed.

As a technique for avoiding such image quality degradation, a certain technique improves the contrast while expanding many gradation portions on a histogram. Japanese Patent Application Laid-Open No. 2009-17200 discusses a technique for changing a use ratio of a tone curve for raising a luminance and a use ratio of a tone curve for reducing the luminance based on histograms of black and white side sections.

In the technique discussed in Japanese Patent Application Laid-Open No. 2009-17200 in which an entire screen is uniformly corrected for the degradation of the dynamic range of a display apparatus, effects of the improved contrast are effective in some portions and not in other portions. As a technique for improving this situation, there has been proposed a technique for changing contrast correction for each portion. Japanese Patent Application Laid-Open No. 10-293841 discusses a technique for raising the contrast and sharpness along with the increase of difference between the average gradation value of an image and the average gradation value of neighborhood pixels of a target pixel. Japanese Patent Application Laid-Open No. 2005-312008 discusses a technique for changing a coefficient of an unsharp-mask in sharpness processing based on the average gradation value of neighborhood pixels of a target pixel.

However, in the technique discussed in Japanese Patent Application Laid-Open No. 10-293841, although the contrast of pixels having a gradation value largely different from the average gradation value of the entire image is improved, the contrast of pixels having a gradation value close to the average gradation value of the entire image is not improved.

In the technique discussed in Japanese Patent Application Laid-Open No. 2005-312008, if the coefficient of the unsharp-mask is increased, there arises an overshoot in the lightest portion or an undershoot in the darkest portion. As a result, image quality degradation such as blown-out highlights, blocked-up shadows, and an edge shoot occurs.

Using the above-described conventional techniques, it is not easy to restrain image quality degradation when an image wherein a wide dynamic range is assumed is displayed with a narrow dynamic range.

SUMMARY OF THE INVENTION

According to an aspect of at least one embodiment of the present disclosure, an image processing apparatus includes, a first acquisition unit configured to, in order to generate a converted image having a narrower dynamic range than an input image, acquire gradation values of a plurality of neighborhood pixels positioned in a predetermined range from a processing target pixel of the input image, a second acquisition unit configured to acquire conversion information from a holding unit holding the conversion information used to generate the converted image having a narrower dynamic range than the input image, and a determination unit configured to determine a gradation value of a pixel on the converted image corresponding to the processing target pixel by using the gradation values of the plurality of neighborhood pixels acquired by the first acquisition unit and the conversion information acquired by the second acquisition unit.

According to other aspects of the present disclosure, one or more additional image processing apparatuses, one or more image processing methods, and one or more storage mediums for use with same are discussed herein. Further features of the present disclosure will become apparent from the following description of exemplary embodiments with reference to the attached drawings.

BRIEF DESCRIPTION OF THE DRAWINGS

FIG. 6 illustrates a tone curve in an intermediate light gradation portion.

FIG. 7 illustrates a ratio conversion table for four different tone curves.

DESCRIPTION OF THE EMBODIMENTS

Figure 1:
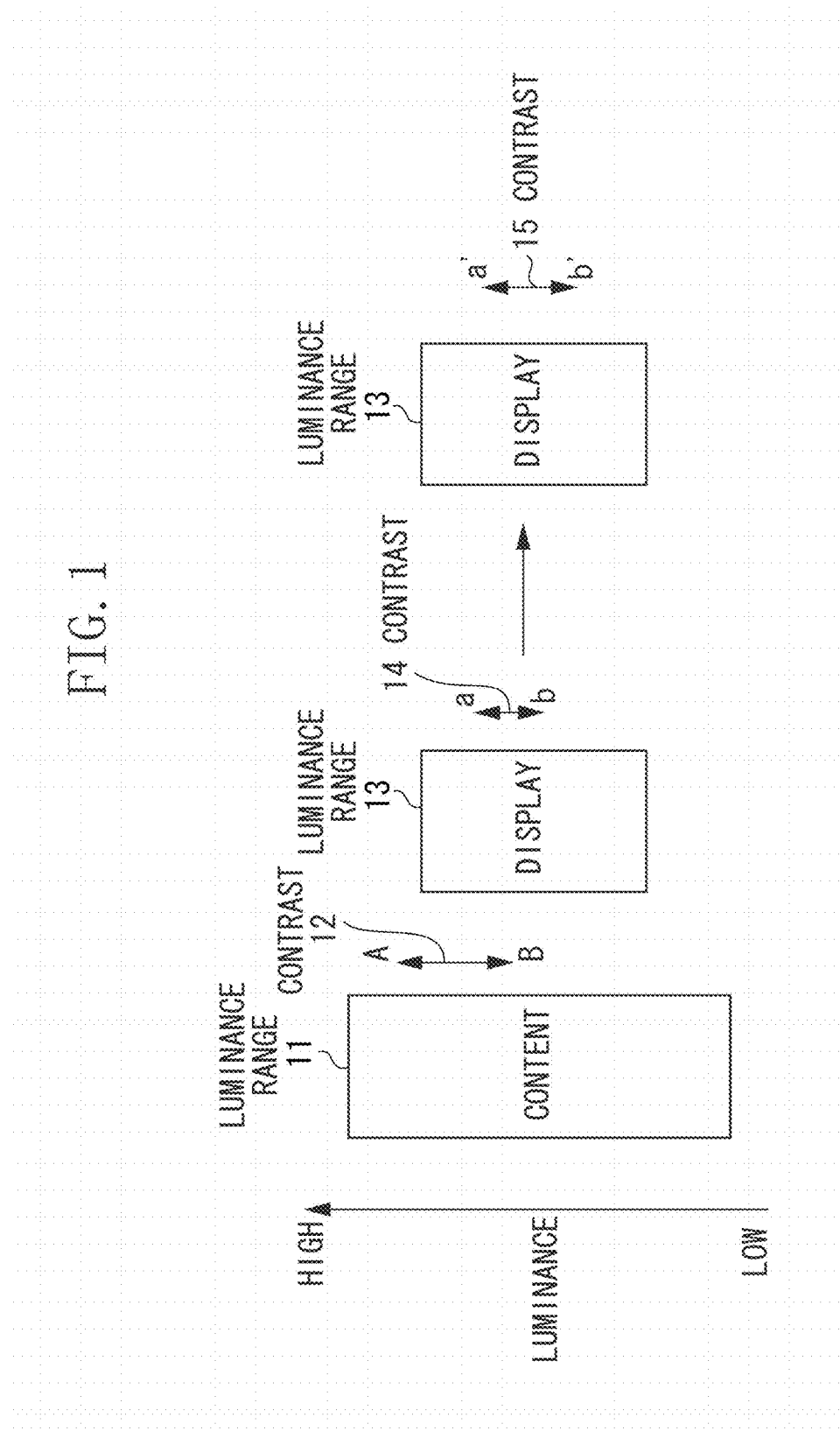
FIG. 1 illustrates a relation between a dynamic range and contrast.

A relation between an original content, a dynamic range of a display apparatus (display), and contrast thereof will be described below with reference to FIG. 1. FIG. 1 illustrates an example of a relation between a content, the dynamic range of the display apparatus, and the contrast thereof.

Referring to FIG. 1, a vertical axis indicates a luminance. The higher a position on the axis, the higher the luminance.

Referring to FIG. 1, a luminance range 11 is the luminance range assumed by the content. Contrast 12 is contrast between certain gradations A and B in the content. A luminance range 13 is the luminance range to be displayed by the display apparatus. Contrast 14 is contrast between certain gradations a and b of the display apparatus. Contrast 15 is contrast between gradations a' and b' with which the contrast is expanded by performing processing according to the present exemplary embodiment (described below).

A ratio of the luminance ranges used for the content and the display apparatus is equal to the dynamic range of the content or the display apparatus.

The dynamic range of BT709, i.e., a representative standard in TV broadcast, is only about 850. This dynamic range is so narrow that blown-out highlights may occur. Therefore, with a photographing camera, a high gradation region is folded by 200 to 400% on a gamma curve. Accordingly, the dynamic range assumed by the content is about 2000 to 3000. However, there are cases where the dynamic range actually displayed is only 500 due to the performance of the display apparatus and where only about 100 by the influence of outdoor daylight and reflected light of display.

The contrast in the respective luminance ranges of the content and the display apparatus will be described below.

In the luminance range 11 assumed by the content, the contrast 12 between the gradations A and B is A/B.

When the luminance range 13 displayed by the display apparatus is narrower than the luminance range 11 assumed by the content, in other words, when the content is displayed on a display apparatus having a dynamic range narrower than the dynamic range assumed by the content, the gradation A becomes the gradation a and the gradation B becomes the gradation b. Therefore, the contrast between the gradations a and b corresponding to the gradations A and B, respectively, is a/b. In this case, a condition a/b<A/B is satisfied.

With a luminance range C assumed by the content and a luminance range D displayed by the display apparatus, the contrast 14 between the gradations a and b of the display apparatus becomes a/b=(D/C)×(A/B), which is reduced by D/C times the original contrast 12 (=A/B). Therefore, for a viewer, it seems that an image not only with a low dynamic range but also with a low contrast is displayed by the display apparatus.

The following exemplary embodiments perform contrast expansion processing in which the gradation a is changed to the gradation a' which is higher than the gradation a, the gradation b is changed to the gradation b' which is lower than the gradation b, or both pieces of processing are performed. In this case, the contrast 15 between the gradations a' and b' is larger than the contrast 14 between the gradations a and b. More specifically, a condition a'/b'>a/b is satisfied.

Performing this processing enables improving the image quality degradation due to the degraded contrast without directly improving the dynamic range of the display apparatus. Each exemplary embodiment will be described below.

A first exemplary embodiment will be described below.

Figure 2:
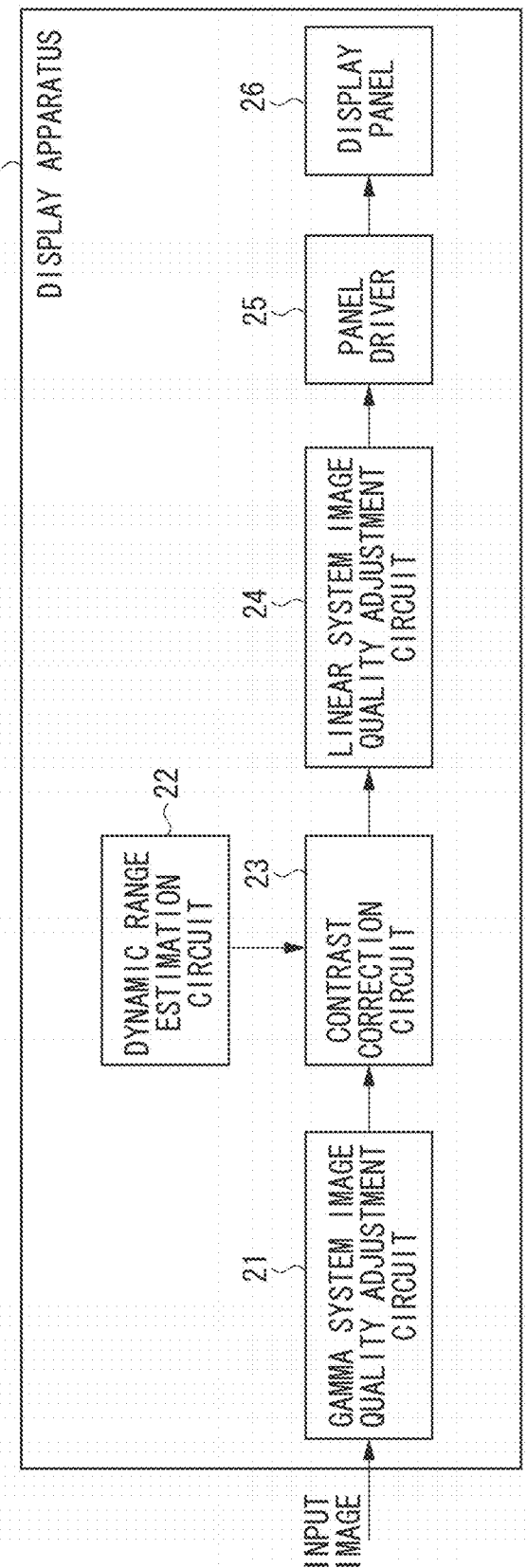
FIG. 2 illustrates a configuration of a display apparatus.

FIG. 2 is a block diagram illustrating an exemplary embodiment of an overall configuration of a display apparatus 20 including an image quality processing device.

Referring to FIG. 2, a gamma system image quality adjustment circuit 21 performs gamma system image quality correction on an input image. A dynamic range estimation circuit 22 calculates a reduction ratio of the dynamic range. A contrast correction circuit 23 corrects the contrast of an image that has undergone the gamma system image quality correction according to the narrowness of the dynamic range. A linear system image quality adjustment circuit 24 performs linear system image quality correction on an image that has undergone the gamma system image quality correction. A panel driver 25 converts an image signal that has undergone the linear system image quality correction into a display panel drive signal. A display panel 26 displays an image.

An input image can be obtained, for example, through an external input or by decoding a signal received by a TV tuner.

An image (input image) input to the display apparatus 20 is normally a gamma system image to which the gamma value 2.2 is applied. The gamma system image quality adjustment circuit 21 performs gamma system image processing such as gamma system scaling on the input image.

The dynamic range estimation circuit 22 estimates the actually displayed dynamic range based on an original dynamic range of the display panel 26 and an environmental illuminance (an ambient illuminance of the display apparatus 20). The original dynamic range of the display panel 26 is obtained by measuring a white luminance, a black luminance, or a luminance for a gradation value 1 of the display panel 26 at the time of shipment. In the case of an image quality processing device without the display panel 26, a user sets such a value as 500 or 1000 as the dynamic range of the display panel 26.

According to the present exemplary embodiment, the display apparatus 20 is provided with an illuminance sensor (not illustrated). The illuminance sensor senses the environmental illuminance. The larger the ambient illuminance of the display apparatus 20 (more specifically, the lighter the periphery thereof), the narrower the dynamic range of the display panel 26.

When the display apparatus 20 is not provided with an illuminance sensor, the user sets how much the dynamic range is narrowed with respect to the original dynamic range of the display panel 26. For example, the user sets such a value as ⅕ or 1/20.

The user also needs to set the dynamic range assumed by the content displayed by the display apparatus 20. As described above, normal broadcasting images are assumed to have a dynamic range of about 2000. Therefore, it is necessary that the initial value of the dynamic range assumed by the content is set to 2000 and that the assumed dynamic range is changeable by the user depending on the content displayed by the display apparatus 20.

The dynamic range estimation circuit 22 calculates the reduction ratio of the dynamic range as follows.

With a dynamic range CD assumed by the content, a dynamic range DD of the display panel 26, and a dynamic range reduction ratio KK by the environmental illuminance, a dynamic range reduction ratio SK to be obtained is represented by the following formula (1).

$$SK=(DD/CD) \times KK \qquad (1)$$

For example, the dynamic range assumed by the content is 2000, the dynamic range of the display panel 26 is 500, and the dynamic range is reduced to ⅓ by an ambient light, the dynamic range reduction ratio SK becomes 1/12 (formula (2)).

$$SK=(500/2000) \times \frac{1}{3} = \frac{1}{12} \qquad (2)$$

When a dynamic range magnification GDR is the reciprocal of the dynamic range reduction ratio SK, i.e., GDR=1/SK, the dynamic range magnification GDR is 12.

The contrast correction circuit 23 derives the dynamic range magnification GDR by obtaining the reciprocal of the dynamic range reduction ratio SK calculated by the dynamic range estimation circuit 22. The contrast correction circuit 23 performs contrast correction processing based on the dynamic range magnification GDR on an image signal output from the gamma system image quality adjustment circuit 21. The contrast correction circuit 23 will be described in detail below with reference to FIG. 3. The dynamic range magnification GDR may be derived by the dynamic range estimation circuit 22.

When the dynamic range displayed by the display apparatus 20 is wide enough and is wider than the dynamic range assumed by the content, it is not necessary to perform contrast correction processing. In this case, the contrast correction circuit 23 outputs the image signal to the linear system image quality adjustment circuit 24 without performing contrast correction on the image signal output from the gamma system image quality adjustment circuit 21.

Since the image signal output from the contrast correction circuit 23 is a gamma system signal, the linear system image quality adjustment circuit 24 converts the image signal into a linear system signal and then performs linear system edge intensifying processing on the linear system signal to adjust the image quality.

FIG. 2 illustrates as an example of a case where an image processing apparatus is built in the display apparatus 20. However, as an image quality adjustment apparatus incorporating an image processing apparatus, an image quality processing apparatus may be configured to be connected to a preceding stage of a general display apparatus. Further, as an imaging apparatus incorporating an image processing apparatus, an image processing apparatus may be configured to be connected to the following stage of a general imaging apparatus.

Figure 3:
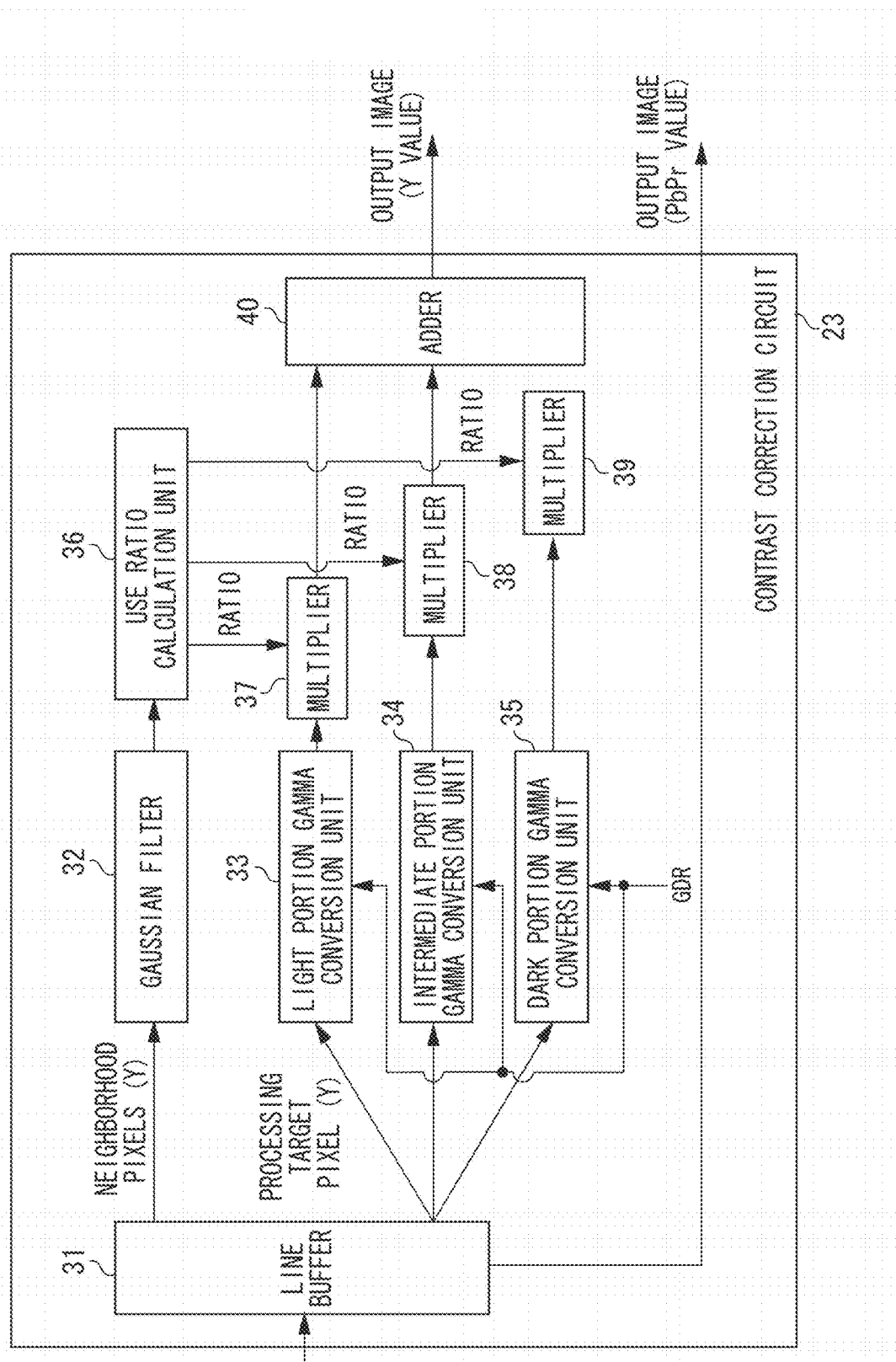
FIG. 3 illustrates a first exemplary embodiment of a configuration of a contrast correction circuit.

FIG. 3 is a block diagram illustrating an exemplary embodiment of a configuration of the contrast correction circuit 23 in the image processing apparatus according to the present exemplary embodiment.

Referring to FIG. 3, line buffers 31 temporarily stores an input image signal. A Gaussian filter 32 calculates a neighborhood average gradation value which is an average value of the gradation values of neighborhood pixels of a processing target pixel. A light portion gamma conversion unit 33 expands a light gradation portion. An intermediate portion gamma conversion unit 34 expands an intermediate gradation portion. A dark portion gamma conversion unit 35 expands a dark gradation portion. The light gradation portion refers to a relatively light region (a region having large gradation values). The dark gradation portion refers to a relatively dark region (a region having small gradation values). The intermediate gradation portion refers to a region having brightness between the light and the dark gradation portions (a region having intermediate gradation values).

A use ratio calculation unit 36 derives a use ratio for outputs of the light portion gamma conversion unit 33, the intermediate portion gamma conversion unit 34, and the dark portion gamma conversion unit 35 based on the neighborhood average gradation value. A multiplier 37 multiplies the image signal with the expanded light gradation portion by the use ratio for the output of the light portion gamma conversion unit 33. A multiplier 38 multiplies the image signal with the expanded intermediate gradation portion by the use ratio for the output of the intermediate portion gamma conversion unit 34. A multiplier 39 multiplies the image signal with the expanded dark gradation portion by the use ratio for the output of the dark portion gamma conversion unit 35.

It is easier to perform processing in a luminance-and-chrominance (YPbPr) color space. Therefore, when the input image signal is an image signal in a red, green and blue (RGB) color space, the contrast correction circuit 23 converts the color space of the image signal into a luminance-and-chrominance (YPbPr) color space and performs processing only on the value of a luminance signal (Y). Then, the contrast correction circuit 23 adds the value of the luminance signal (Y) processed by the contrast correction circuit 23 and the value of the chrominance signal (PbPr) and returns the color space of an image signal to the RGB color space.

Since a normal input image is input by raster scan, the line buffer 31 holds an image signal only for the number of lines required by the Gaussian filter 32. For example, when using a 9×9 Gaussian filter 32, the line buffer 31 holds the image signal for 9 lines. The Gaussian filter 32 performs calculation by using only the gradation value of the luminance signal (Y). Therefore, the line buffer 31 needs only to hold the gradation value of the luminance signal (Y) for 9 lines, and to hold a chrominance signal (PbPr) for 5 lines, which is a time period until the processing target pixel can be calculated, to be output in synchronization with the luminance signal (Y).

The Gaussian filter 32 calculates the average value of the gradation values of pixels in the neighborhood region of the current processing target pixel. The Gaussian filter 32 sets weights by using the Gaussian distribution (setting larger weights for average value calculation for pixels closer to the processing target pixel, and setting smaller weights for pixels farther from the processing target pixel). An average value filter may be used instead of a Gaussian filter. In this case, a circuit scale decreases although the influence of pixels distant from the processing target pixel increases. If the 9×9 filter size is too large, a smaller size (7×7 or 5×5) Gaussian filter may be used since the accuracy of the correction processing result only slightly degrades.

Calculating the average value (neighborhood average gradation value) of the gradation values of pixels in the neighborhood region of the processing target pixel in this way enables simply calculating the degree of the light or dark portion of the processing target pixel.

If the circuit scale can be increased, a representative value of the gradation values of pixels in the neighborhood region of the processing target pixel may be derived without using the neighborhood average gradation value. For example, the representative value can be derived by performing super pixel processing or a split-and-merge method as a kind of segmentation. Performing segmentation of the processing target image enables determining an image region including the processing target pixel. Therefore, the contrast can be suitably corrected by using the average value of the gradation values of the image region.

For each of the light portion gamma conversion unit 33, the intermediate portion gamma conversion unit 34, and the dark portion gamma conversion unit 35, the degree of the expansion of the gradation portion can be achieved by changing an inclination of a tone curve of each gradation portion to be expanded, according to the dynamic range magnification GDR. The inclination of the tone curve is represented by the ratio of an increased amount of the gradation value of an output pixel when the gradation value of an input pixel is increased by an increased amount to the increased amount of the gradation value of the input pixel. After the gradation value of the luminance signal (Y) is processed by the light portion gamma conversion unit 33, the intermediate portion gamma conversion unit 34, and the dark portion gamma conversion unit 35, the contrast correction circuit 23 outputs three different luminance signals (Y) in which the respective gradation values are converted to expand mutually different gradation portions. The light portion gamma conversion unit 33, the intermediate portion gamma conversion unit 34, and the dark portion gamma conversion unit 35 will be described in detail below with reference to FIGS. 4A, 4B, and 4C, respectively.

By using a ratio conversion table from the neighborhood average gradation value output from the Gaussian filter 32, the use ratio calculation unit 36 determines the use ratios for the outputs of the light portion gamma conversion unit 33, the intermediate portion gamma conversion unit 34, and the dark portion gamma conversion unit 35. The ratio conversion table will be described in detail below with reference to FIGS. 5A and 5B.

The multipliers 37, 38, and 39 multiply the respective outputs (image signals with the expanded light, intermediate, and dark gradation portions) from the light portion gamma conversion unit 33, the intermediate portion gamma conversion unit 34, and the dark portion gamma conversion unit 35 by the respective use ratios. An adder 40 adds the three outputs (signals obtained by multiplying the expanded light, intermediate, and dark gradation portions by the respective use ratios) from the multipliers 37, 38, and 39, respectively. Thus, the outputs of the light portion gamma conversion unit 33, the intermediate portion gamma conversion unit 34, and the dark portion gamma conversion unit 35 are mixed to obtain the luminance signal (Y) after correction processing. The luminance signal (Y) after correction processing and the chrominance (PbPr) with which a delay amount is adjusted by the line buffer 31 are combined and output to the linear system image quality adjustment circuit 24 as an output image. When an image signal in the RGB color space is required in its post-process, normal YPbPr-RGB conversion will be performed.

Figure 4A:
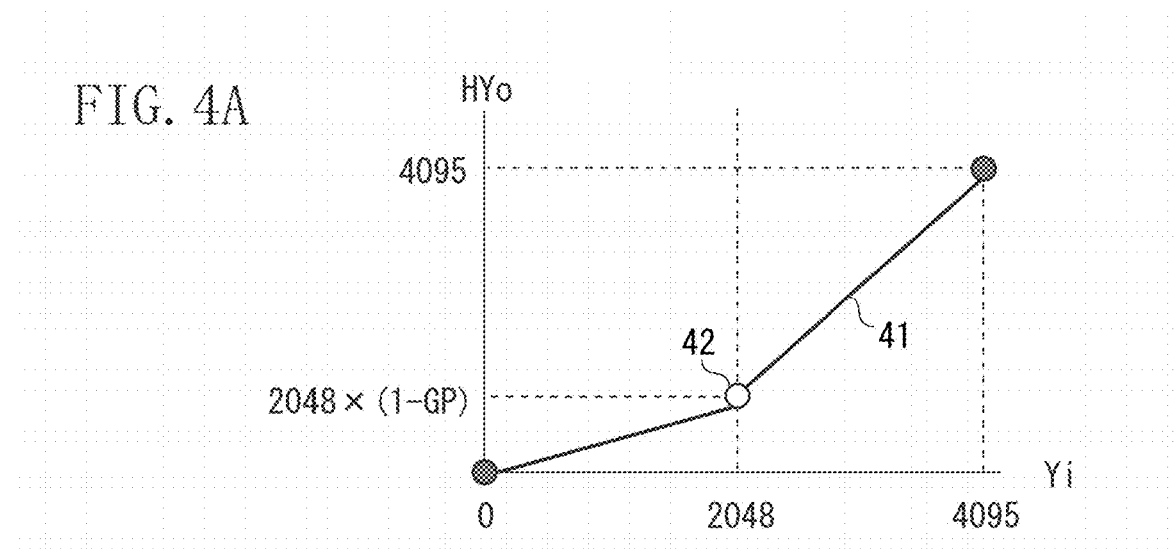
FIGS. 4A, 4B, and 4C illustrate tone curves in a light gradation portion, an intermediate gradation portion, and a dark gradation portion, respectively.
Figure 4B:
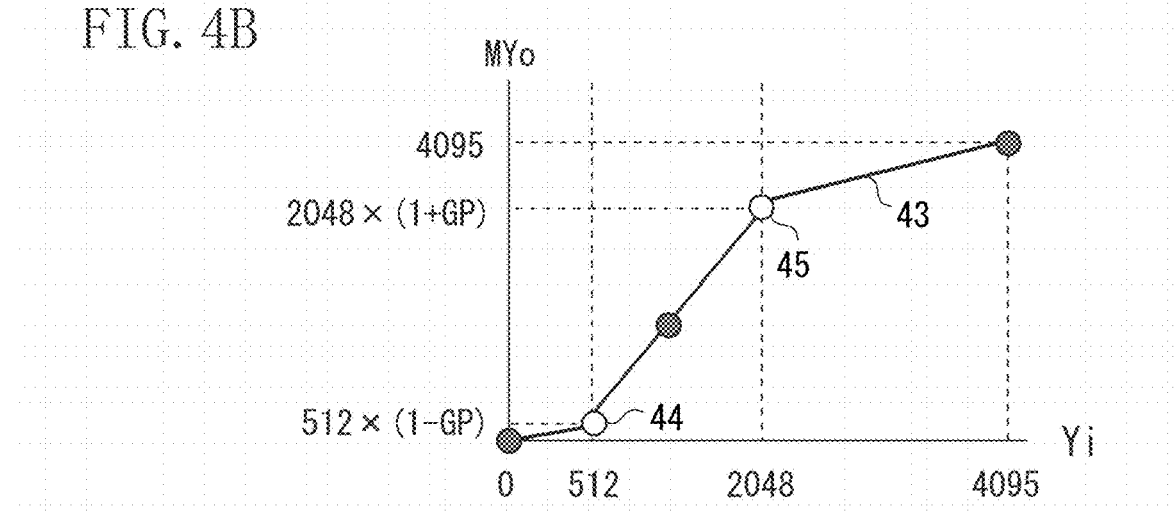
Figure 4C:
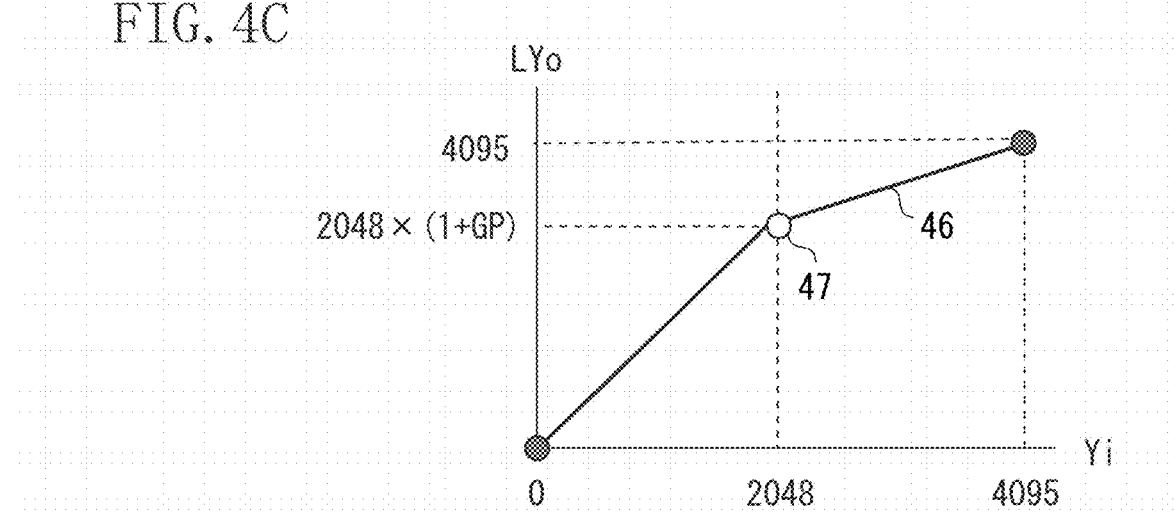

The following describes examples of processing by the light portion gamma conversion unit 33, the intermediate portion gamma conversion unit 34, and the dark portion gamma conversion unit 35 by using tone curves, with reference to FIGS. 4A, 4B, and 4C. FIGS. 4A, 4B, and 4C illustrate examples of tone curves in the light, the intermediate, and the dark gradation portions, respectively.

FIG. 4A illustrates an example of a tone curve for the light gradation portion. FIG. 4B illustrates an example of a tone curve for the intermediate gradation portion. FIG. 4C illustrates an example of a tone curve for the dark gradation portion. Referring to FIGS. 4A, 4B, and 4C, a horizontal axis Yi indicates a gamma system 12-bit gradation value as the gradation value of the luminance signal (Y) before correction, and each of vertical axes HYo, MYo, and LYo indicates the gamma system 12-bit gradation value as the gradation value of the luminance signal (Y) after correction.

Referring to the example illustrated in FIG. 4A, the light gradation portion (a portion with the gradation value 2048 or larger out of all (4095) gradations) is assumed to be a light portion. The inclination of a light gradation portion tone curve 41 in the light portion is assumed to be 1 or larger (preferably larger than 1). When such a tone curve is applied to the luminance signal (Y), the light gradation portion of the luminance signal (Y) output from the light portion gamma conversion unit 33 is expanded to a further extent than the light gradation portion of the luminance signal (Y) input to the light portion gamma conversion unit 33, resulting in the raised contrast of the light gradation portion. The boundary between the light and the dark gradation portions (minimum gradation value in the light gradation portion) is not limited to the gradation value 2048, and may be a predetermined value other than 2048 (for example, 1024).

The magnitude (degree) of the inclination of the light gradation portion of the light gradation portion tone curve 41 can be controlled by a control point 42 on the light gradation portion tone curve 41. To raise the contrast, the output value HYo at the control point 42 on the light gradation portion tone curve 41 is made smaller than 2048, and the inclination of the light portion of the light gradation portion tone curve 41 is increased.

Referring to FIGS. 4A, 4B, and 4C, a coefficient GP is used to raise the contrast according to the dynamic range magnification GDR. The larger the dynamic range magnification GDR, the larger the value of the coefficient GP needs to be.

For example, the dynamic range magnification GDR can be converted into the coefficient GP by the following formula (3).

$$GP = k \times GDR^j \quad (3)$$

where $k > 0$ and $j > 0$.

Referring to the formula (3), for example, $k=0.02$ and $j=0.45$ can be given. When the coefficient GP is specifically calculated in this example, the coefficient GP is 0.06 when the dynamic range magnification GDR is 12, and is 0.123 when the dynamic range magnification GDR is 64. However, the above-described values of the constants k and j ($k=0.02$, $j=0.45$) are examples, and may be suitably adjusted.

For example, adding an element of a neighborhood average gradation value LPFY to the calculation formula of the coefficient GP enables providing a higher contrast to a lighter gradation portion or providing a higher contrast to a darker gradation portion. For example, applying the larger coefficient GP for the larger neighborhood average gradation value LPFY enables providing a higher contrast to a lighter gradation portion. Further, applying the larger coefficient GP for the smaller neighborhood average gradation value LPFY enables providing a higher contrast to a darker gradation portion.

Referring to an example illustrated in FIG. 4B, the intermediate gradation portion (a portion with the gradation value 512 to 2048 out of all (4095) gradations) is assumed to be an intermediate portion. The inclination of an intermediate gradation portion tone curve 43 in the intermediate portion is assumed to be 1 or larger (preferably larger than 1). When such a tone curve is applied to the luminance signal (Y), the intermediate gradation portion of the luminance signal (Y) output from the intermediate portion gamma conversion unit 34 is expanded to a further extent than the intermediate gradation portion of the luminance signal (Y) input to the intermediate portion gamma conversion unit 34, resulting in the raised contrast of the intermediate gradation portion. The boundary between the intermediate and the dark gradation portions (minimum gradation value in the intermediate gradation portion) is not limited to the gradation value 512, and may be a predetermined value other than 512 (for example, 256). The boundary between the intermediate and the light gradation portions (maximum gradation value in the intermediate gradation portion) is not limited to the gradation value 2048, and may be a predetermined value other than 2048 (for example, 1024). There needs to be an intermediate portion between the dark and the light portions.

The magnitude (degree) of the inclination of the intermediate gradation portion of the intermediate gradation portion tone curve 43 can be controlled by a dark side control point 44 and a light side control point 45 on the intermediate gradation portion tone curve 43. To raise the contrast, the inclination of the intermediate gradation portion of the intermediate gradation portion tone curve 43 is increased. More specifically, the output value MYo at the dark side control point 44 on the intermediate gradation portion tone curve 43 is made smaller than 512, and the output value MYo at the light side control point 45 thereon is made larger than 2048.

Referring to an example illustrated in FIG. 4C, the dark gradation portion (a portion with the gradation value 2048 or less out of all (4095) gradations) is assumed to be a dark portion. The inclination of a dark gradation portion tone curve 46 in the dark portion is assumed to be 1 or larger (preferably larger than 1). When such a tone curve is applied to the luminance signal (Y), the dark gradation portion of the luminance signal (Y) output from the dark portion gamma conversion unit 35 is expanded to a further extent than the dark gradation portion of the luminance signal (Y) input to the dark portion gamma conversion unit 35, resulting in the raised contrast of the dark gradation portion. The boundary between the dark and the light gradation portions (maximum gradation value in the dark gradation portion) is not limited to the gradation value 2048, and may be a predetermined value other than 2048 (for example, 1024 or 512).

The magnitude (degree) of the inclination of the dark gradation portion of the dark gradation portion tone curve 46 can be controlled by a control point 47 on the dark gradation portion tone curve 46. To raise the contrast, the output value LYo at the control point 47 on the dark gradation portion tone curve 46 is made larger than 2048, and the inclination of the dark portion of the dark gradation portion tone curve 46 is increased.

The present exemplary embodiment has been described above centering on an example of a case where, when individually performing gamma conversion on the gradation value of the luminance signal (Y) to expand the range of relatively large gradation values, the range of relatively intermediate gradation values, and the range of relatively small gradation values, a tone curve is implemented by a straight line connecting control points. The tone curve needs to partially be a straight line, and can be implemented by a circuit which combines multipliers and an adder. To achieve the gamma conversion, for example, look-up tables may be used instead of functions. Using look-up tables makes it easier to curve a tone curve. Also in this case, the inclination of (a tangent of) the tone curve needs to be 1 or larger in each of the light, the intermediate, and the dark gradation portions. Further, in this case, the look-up tables for the light, the intermediate, and the dark gradation portions are continuously changed according to the neighborhood average gradation value.

Figure 5A:
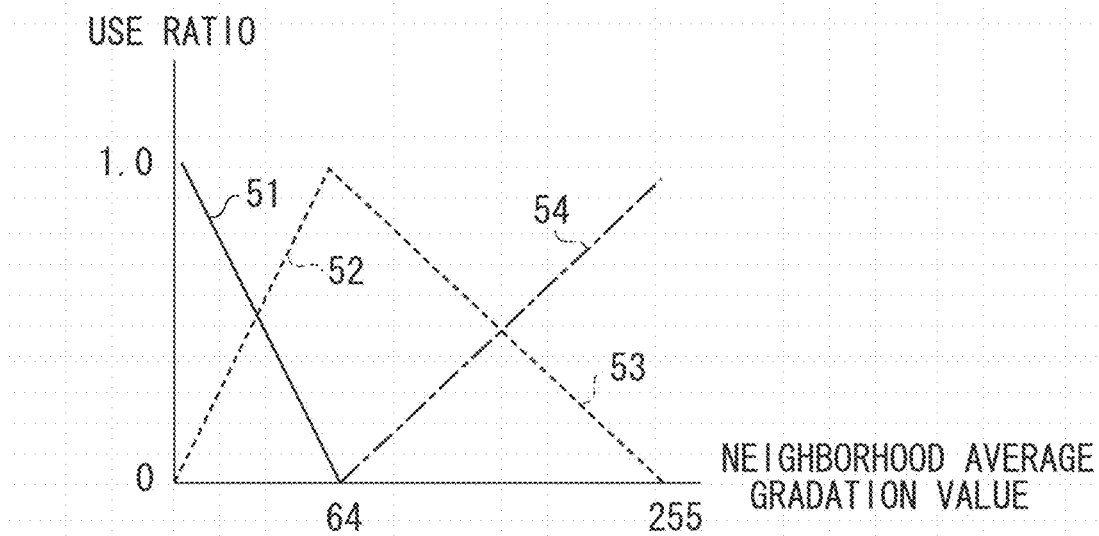
FIGS. 5A and 5B illustrate ratio conversion tables for three different tone curves.
Figure 5B:
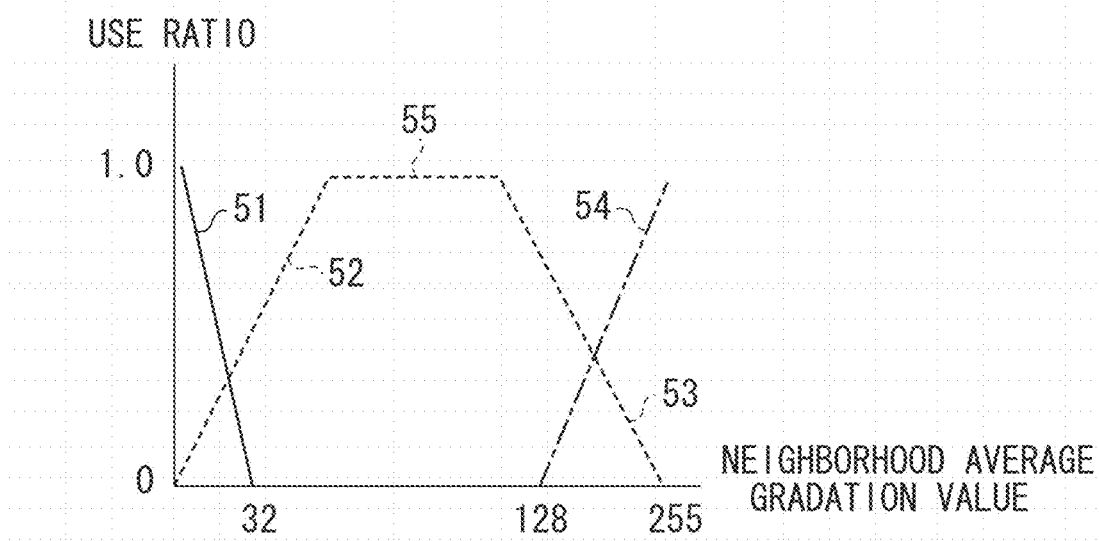

Examples of ratio conversion tables used by the use ratio calculation unit 36 illustrated in FIG. 3 will be described below with reference to FIGS. 5A and 5B. FIGS. 5A and 5B illustrate examples of ratio conversion tables for the above-described three different tone curves (the light gradation portion tone curve 41, the intermediate gradation portion tone curve 43, and the dark gradation portion tone curve 46).

FIG. 5A illustrates a first example of a ratio conversion table, and FIG. 5B illustrates a second example of a ratio conversion table. Referring to FIGS. 5A and 5B, a horizontal axis indicates the neighborhood average gradation value as an 8-bit gradation value. A vertical axis indicates the value of the use ratio ranging from 0 to 1.0.

Referring to FIG. 5A, a use ratio 51 of the output of the dark portion gamma conversion unit 35 is maximized when the neighborhood average gradation value is 0 (zero) and decreases with increasing gradation value. A use ratio 54 of the output of the light portion gamma conversion unit 33 is maximized when the neighborhood average gradation value is 255 and decreases with decreasing gradation value. Use ratios 52 and 53 of the output of the intermediate portion gamma conversion unit 34 are set so that the sum of the use ratios 52 and 53 and the two other use ratios 51 and 54 constantly becomes 1.0.

Although, in the ratio conversion table illustrated in FIG. 5A, the light and dark gradation portions change when the neighborhood average gradation value is 64, the light and dark gradation portions may change when the neighborhood average gradation value is a predetermined value other than 64 (for example, 40 or 80).

In the ratio conversion table illustrated in FIG. 5B, the use ratio 51 of the output of the dark portion gamma conversion unit 35 becomes 0 (zero) when the neighborhood average gradation value is 32 and the use ratio of the output of the light portion gamma conversion unit 33 starts increasing when the neighborhood average gradation value is 128. In this case, the use ratios 52, 53, and 55 of the output of the intermediate portion gamma conversion unit 34 are high. Therefore, compared to the ratio conversion table illustrated in FIG. 5A, the contrast of the intermediate gradation portion is intensified.

Conversely, to increase the use ratios of the output of the light portion gamma conversion unit 33 and the output of the dark portion gamma conversion unit 35, these two use ratios need to overlap with each other. For example, the use ratio of the output of the dark portion gamma conversion unit 35 may become 0 (zero) when the neighborhood average gradation value is 96, and the use ratio of the output of the light portion gamma conversion unit 33 may start increasing when the neighborhood average gradation value is 64.

With the above-described settings, for example, the use ratio calculation unit 36 can operate as follows. More specifically, the use ratio calculation unit 36 determines which of the light, the intermediate, and the dark gradation portions is the processing target pixel according to the neighborhood average gradation value. Then, the use ratio calculation unit 36 determines the use ratio so that the use ratio of the output of a gamma conversion unit which corrects the determined gradation portion is larger than the use ratios of the outputs of other gamma conversion units.

According to the present exemplary embodiment as described above, the gamma conversion units respectively convert the gradation values of the luminance signal (Y) to expand the light, the intermediate, and the dark gradation portions of the luminance signal (Y). Then, the use ratios of the light, the intermediate, and the dark gradation portions are multiplied by the converted gradation values and then added. Therefore, when an image in which a wide dynamic range is assumed is displayed with a narrow dynamic range, it is possible to perform contrast correction with restrained blocked-up shadows and blown-out highlights at high speed (in real time) using a small number of circuits and calculations.

The present exemplary embodiment is not limited to the above descriptions. For example, the number of the tone curves to be used is not limited to three, and may be any number equal to or larger than two. A second exemplary embodiment will be described below in which the number of the tone curves to be used is differentiated from that in the first exemplary embodiment.

The second exemplary embodiment will be described below centering on an example of a case where four tone curves are used. In this way, the present exemplary embodiment differs from the first exemplary embodiment mainly in the configuration and processing in which different tone curves are used. Therefore, in the descriptions of the present exemplary embodiment, elements identical to those in the first exemplary embodiment are assigned the same reference numerals as those in FIGS. 1 to 5, and detailed descriptions thereof will be omitted.

According to the present exemplary embodiment, since the number of the tone curves is increased from 3 to 4, the number of gamma conversion units and the number of multipliers illustrated in FIG. 3 are each increased from 3 to 4. The use ratio calculation unit 36 derives the use ratios for the outputs of the four gamma conversion units. Since the contrast correction circuit according to the present exemplary embodiment differs from the contrast correction circuit 23 illustrated in FIG. 3 in these points, an illustration of the configuration will be omitted. The present exemplary embodiment uses the four different tone curves including an intermediate light gradation portion tone curve in addition to the dark gradation portion tone curve 46, the intermediate gradation portion tone curve 43, and the light gradation portion tone curve 41 according to the first exemplary embodiment. In the following descriptions, a gamma conversion unit for performing contrast correction by using the intermediate light gradation portion tone curve is referred to as an intermediate light portion gamma conversion unit as required.

FIG. 6 illustrates an example of the fourth tone curve (an intermediate light gradation portion tone curve 61) which has been added in the present exemplary embodiment.

Referring to FIG. 6, the horizontal axis Yi indicates the gamma system 12-bit gradation value as the gradation value of the luminance signal (Y) to be input. A vertical axis MHYo indicates the gamma system 12-bit gradation value as the gradation value of the luminance signal (Y) to be output.

Referring to the example illustrated in FIG. 6, an especially light side of the intermediate gradation portion (for example, a portion with the gradation value 1024 or larger or 3072 or less out of all (4095) gradations) is referred to as an intermediate light portion. The inclination of an intermediate light gradation portion tone curve 61 in the intermediate light portion is assumed to be 1 or larger. When such a tone curve is applied to the luminance signal (Y), the intermediate light gradation portion of the luminance signal (Y) output from the intermediate light portion gamma conversion unit is expanded to a further extent than the intermediate light gradation portion of the luminance signal (Y) input to the intermediate light portion gamma conversion unit, resulting in the raised contrast of the intermediate light gradation portion. The boundary between the intermediate light and the intermediate gradation portions (minimum gradation value in the intermediate light gradation portion) is not limited to the gradation value 1024, and may be a predetermined value other than 1024 (for example, 1536). The boundary between the intermediate light and the light gradation portions (maximum gradation value in the intermediate light gradation portion) is not limited to the gradation value 3072, and may be a predetermined value other than 3072 (for example, 2048). There needs to be an intermediate light gradation portion between the intermediate and the light gradation portions.

The magnitude (degree) of the inclination of the intermediate light gradation portion of the intermediate light gradation portion tone curve 61 can be controlled by a dark side control point 62 and a light side control point 63 on the intermediate light gradation portion tone curve 61. To raise the contrast, the inclination of the intermediate light gradation portion of the intermediate light gradation portion tone curve 61 is increased. More specifically, the output value MHYo at the dark side control point 62 on the intermediate light gradation portion tone curve 61 is made smaller than 1024, and the output value MHYo at the light side control point 63 thereon is made larger than 3072.

A method for correcting the contrast by using these control points is similar to the method described with reference to FIGS. 4A, 4B, and 4C, and detailed descriptions thereof will be omitted.

An example of a ratio conversion table used by the use ratio calculation unit 36 according to the present exemplary embodiment will be described below with reference to FIG. 7. FIG. 7 illustrates an example of a ratio conversion table for the four different tone curves (the light gradation portion tone curve 41, the intermediate gradation portion tone curve 43, the intermediate light gradation portion tone curve 61, and the dark gradation portion tone curve 46).

Referring to FIG. 7, a horizontal axis indicates the neighborhood average gradation value as an 8-bit gradation value. A vertical axis indicates the value of the use ratio ranging from 0 to 1.0.

Referring to FIG. 7, a use ratio 71 of the output of the dark portion gamma conversion unit 35 is maximized when the neighborhood average gradation value is 0 (zero) and decreases with increasing gradation value. A use ratio 76 of the output of the light portion gamma conversion unit is maximized when the neighborhood average gradation value is 255 and decreases with decreasing gradation value. A low gradation side portion 72 of the use ratio of the output of the intermediate portion gamma conversion unit 34 increases so that the sum of this use ratio and the use ratio of the output of the dark portion gamma conversion unit 35 becomes 1.0. A high gradation side portion 73 of the use ratio of the output of the intermediate portion gamma conversion unit 34 decreases with increasing gradation value. Use ratios 74 and 75 of the output of the intermediate light portion gamma conversion unit are set so that the sum of the two use ratios and other use ratios constantly becomes 1.0.

Increasing the number of the tone curves in this way slightly increases the number of circuits but reduces the possibility that each tone curve having adjacent gradation ranges cancel contrast expansion, more effectively providing the contrast expansion.

Also in the present exemplary embodiment, various modifications according to the first exemplary embodiment can be employed.

In the above-described first and second exemplary embodiments, outputs of a plurality of gamma conversion units are mixed as an example of a method for converting the gradation value by using tone curves. However, the method for converting the gradation value by using tone curves is not limited thereto. A third exemplary embodiment will be described below in which the outputs of a plurality of gamma conversion units are not mixed.

The third exemplary embodiment, by using one gamma conversion unit, limits a range to be used by the gamma conversion unit based on the neighborhood average gradation value to implement the contrast expansion ranging from the light gradation portion to the dark gradation portion. In this way, the present exemplary embodiment differs from the first and the second exemplary embodiments mainly in the configuration and processing in which different methods for converting the gradation value are used. Therefore, in the descriptions of the present exemplary embodiment, elements identical to those in the first and the second exemplary embodiments are assigned the same reference numerals as those in FIGS. 1 to 7, and detailed descriptions thereof will be omitted.

Figure 8:
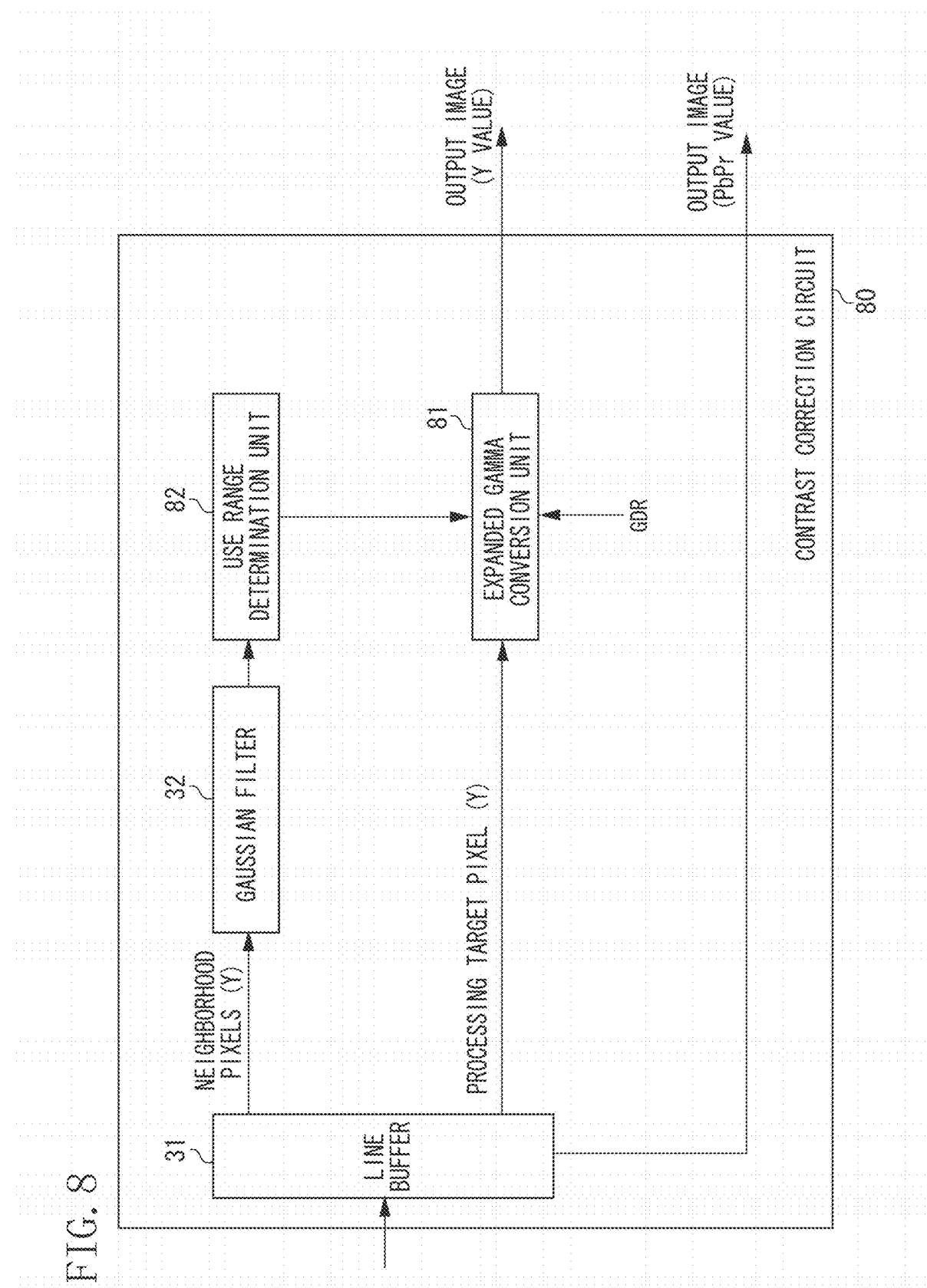
FIG. 8 illustrates a second exemplary embodiment of the configuration of the contrast correction circuit.

FIG. 8 is a block diagram illustrating an example of a configuration of a contrast correction circuit 80 in the image processing apparatus according to the present exemplary embodiment.

Referring to FIG. 8, the line buffer 31 and the Gaussian filter 32 are identical to those described in the first exemplary embodiment. An expanded gamma conversion unit 81 performs the contrast correction by converting the gradation value of the input luminance signal (Y) by using a tone curve having a wider gradation range than the tone curves for the gamma conversion units described in the first and the second exemplary embodiments. In the following description, this tone curve is referred to as a wide range tone curve as required.

Based on the neighborhood average gradation value, a use range determination unit 82 determines a gradation range to be used by the expanded gamma conversion unit 81 out of the gradation range of the wide range tone curve so that the contrast can be expanded for respective gradation ranges from the dark portion to the light portion through the intermediate portion. Then, the luminance signal (Y) processed by the expanded gamma conversion unit 81 and the chrominance (PbPr) with the delay amount adjusted by the line buffer 31 are combined to be output to the linear system image quality adjustment circuit 24 as an output image.

Similar to the contrast correction circuit 23 according to the first exemplary embodiment, the contrast correction circuit 80 according to the present exemplary embodiment performs processing in the luminance color difference system color space. When the input image signal is an image signal in the RGB color space, the contrast correction circuit 80 returns the color space to the RGB color space after processing.

Figure 9:
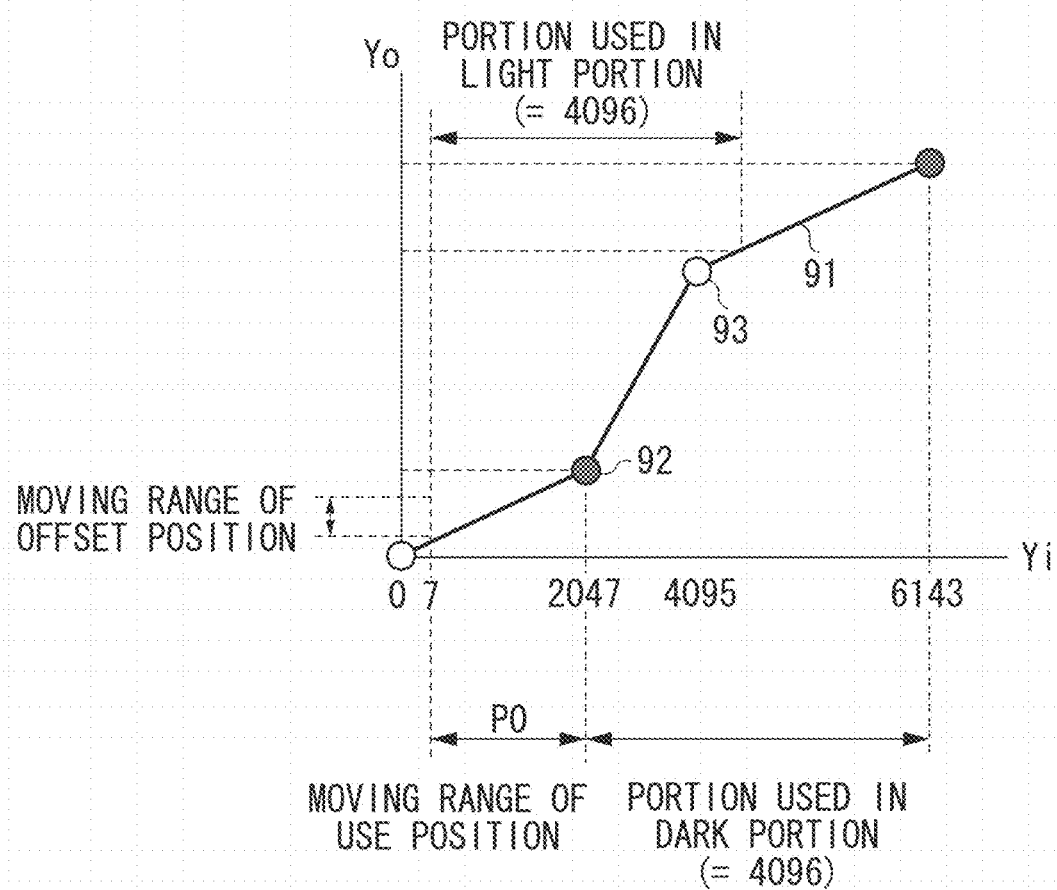
FIG. 9 illustrates a wide range tone curve.

FIG. 9 illustrates an example of a wide range tone curve.

Referring to FIG. 9, a horizontal axis Yi indicates a gradation range 1.5 times the gradation range of the gamma system 12-bit gradation value as the gradation value of the input luminance signal (Y). A vertical axis Yo indicates a gradation range 1.5 times the gradation range of the gamma system 12-bit gradation value as the gradation value of the output luminance signal (Y).

A wide range tone curve 91 has a gradation range which is wider than the gradation range required to convert the gradation value of the processing target image (the gradation range of the processing target image). FIG. 9 illustrates as an example of a gradation range from 0 to 6143 which is 1.5 times the gradation range of the gamma system 12-bit gradation value.

The inclination of the intermediate gradation portion of the wide range tone curve 91 is assumed to be 1 or larger (preferably greater than 1). This inclination can be obtained by making the output value Yo at a dark side control point 92 on the wide range tone curve 91 smaller than 2047 and making the output value Yo at a light side control point 93 thereon larger than 4095. The larger the dynamic range magnification GDR, the larger the degree of making the respective output values Yo smaller and larger than the two values.

Each use range of the wide range tone curve 91 is a range of 4096 gradations extracted from the gradation range from 0 to 6143. When performing the contrast correction on the light gradation portion, a relatively low gradation range is extracted. When performing the contrast correction on the dark gradation portion, a relatively high gradation range is extracted. When performing the contrast correction on the intermediate gradation portion, an intermediate gradation range between these ranges is extracted. Performing the contrast correction in this way enables using the tone curve having an inclination of 1 or larger in the gradation range corresponding to the gradation portion to be expanded.

Which gradation range is to be extracted and used is calculated by the use range determination unit 82.

A neighborhood average gradation value LPFY which is an 8-bit output is 255 in the lightest gradation portion and is 0 in the darkest gradation portion. A point P0 which is the 0 (zero) point of the use range is close to 0 in the lightest gradation portion and is close to 2047 in the darkest gradation portion. For example, the point P0 is linearly calculated by the following formula (4).

$$P0 = 2047 - LPFY \times 8 \quad (4)$$

Referring to the example of the formula (4), the point P0 which is the 0 (zero) point of the use range is 7 in the lightest gradation portion and is 2047 in the darkest gradation portion. Although, in the lightest gradation portion, the point P0 which is the 0 (zero) point of the use range is not 0 (zero) because of a bit error, an error of this level is tolerable.

The following describes an example of a method for determining the use range of the tone curve for each gradation portion according to the neighborhood average gradation value LPFY. FIGS. 10A, 10B, 11A, and 11B illustrate tone curves (a part of the wide range tone curve 91) extracted from the wide range tone curve 91. The tone curves illustrated in FIGS. 10A, 10B, 11A, and 11B are determined for each neighborhood average gradation value.

Figure 10A:
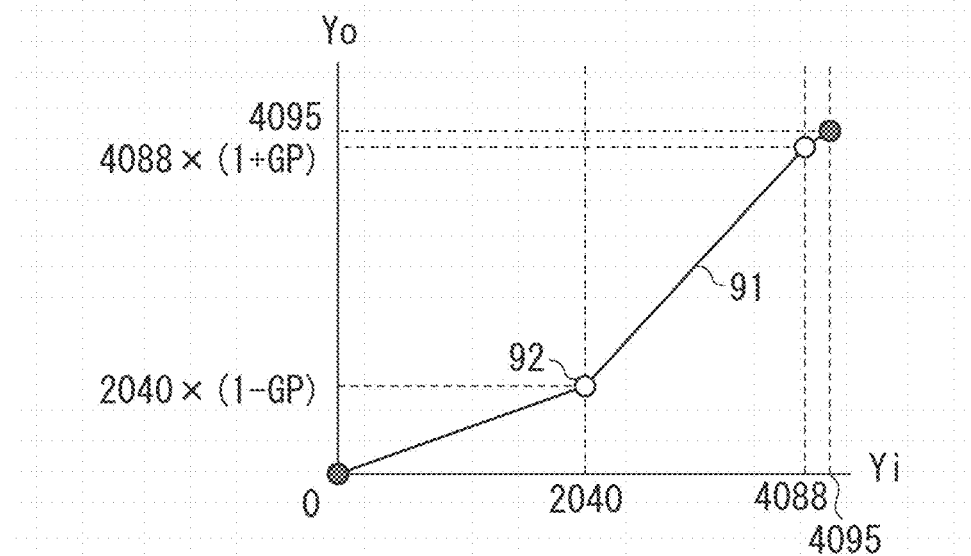
FIGS. 10A and 10B illustrate a first and a second examples of a part of the wide range tone curve.
Figure 10B:
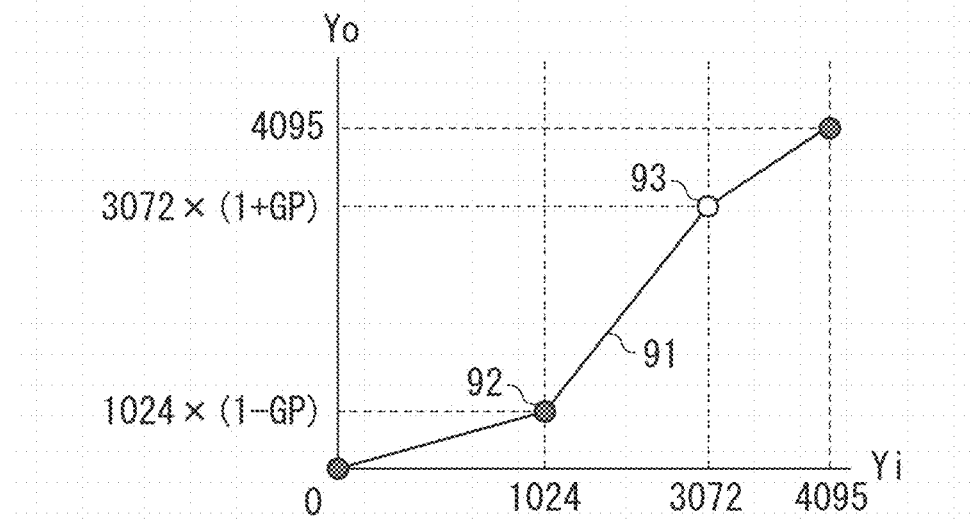
Figure 11A:
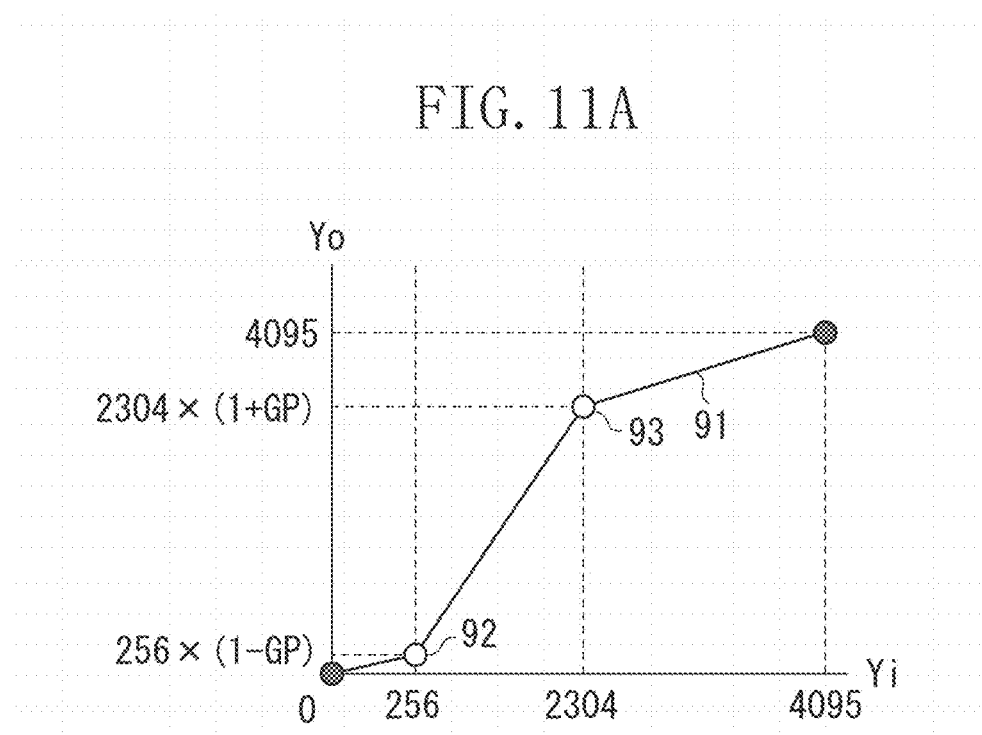
FIGS. 11A and 11B illustrate a third and a fourth examples of a part of the wide range tone curve.
Figure 11B:
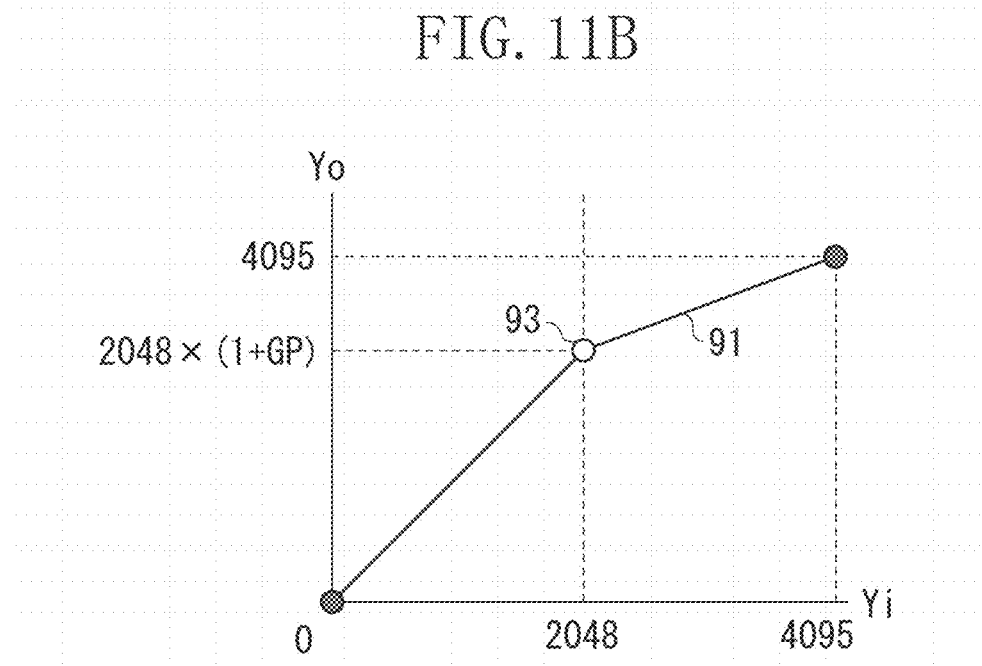

FIG. 10A illustrates an example of a tone curve used for the lightest gradation portion. FIG. 10B illustrates an example of a tone curve used for the intermediate light gradation portion. FIG. 11A illustrates an example of a tone curve used for the intermediate dark gradation portion (intermediate gradation portion according to the first and the second exemplary embodiments). FIG. 11B illustrates an example of a tone curve used for the darkest gradation portion.

Referring to FIGS. 10A, 10B, 11A, and 11B, a horizontal axis Yi indicates the gamma system 12-bit gradation value as the gradation value of the input luminance signal (Y). A vertical axis Yo indicates the gamma system 12-bit gradation value as the gradation value of the output luminance signal (Y).

A method for calculating the coefficient GP based on the dynamic range magnification GDR is similar to the method described above with reference to FIGS. 4A, 4B, and 4C (see the formula (3), etc.).

Referring to FIG. 10A, the tone curve 91 used for the lightest gradation portion is a use range extracted from the wide range tone curve 91 when the neighborhood average gradation value LPFY is 255.

From the formula (4), the point P0 which is the 0 (zero) point of the use range is 7. Therefore, the dark side control point 92 exists at the gradation value 2040 (=2047−7), where the gradation value is reduced by the product of 2040 and (1−GP) depending on the value of the coefficient GP.

The light side control point 93 exists at the gradation value 4088 (=4095−7), where the gradation value is raised by the product of 4088 and (1+GP) depending on the value of the coefficient GP. Therefore, the inclination of the light gradation portion of the tone curve becomes 1 or larger, enabling expanding the light gradation portion and obtaining the gradation value of the luminance signal (Y) with the raised contrast of the light portion.

Referring to FIG. 10B, the tone curve 91 used for the intermediate light gradation portion is a use range extracted from the wide range tone curve 91 when the neighborhood average gradation value LPFY is 128.

From the formula (4), the point P0 which is the 0 (zero) point of the use range is 1023. Therefore, the dark side control point 92 exists at the gradation value 1024 (=2047−1023), where the gradation value is reduced by the product of 1024 and (1−GP) depending on the value of the coefficient GP. The light side control point 93 exists at the gradation value 3072 (=4095−1023), where the gradation value is raised by the product of 3072 and (1+GP) depending on the value of the coefficient GP. Therefore, the inclination of the tone curve becomes 1 or larger for the intermediate to the light gradations, enabling expanding the intermediate light gradation portion and obtaining the gradation value of the luminance signal (Y) with the raised contrast of the intermediate light gradation portion.

Referring to FIG. 11A, the tone curve 91 used for the intermediate dark gradation portion is a use range clipped from the wide range tone curve 91 when the neighborhood average gradation value LPFY is 32.

From the formula (4), the point P0 which is the 0 (zero) point of the use range is 1791. Therefore, the dark side control point 92 exists at the gradation value 256 (=2047−1791), where the gradation value is reduced by the product of 256 and (1−GP) depending on the value of the coefficient GP. The light side control point 93 exists at the gradation value 2304 (=4095−1791), where the gradation value is raised by the product of 2304 and (1+GP) depending on the value of the coefficient GP. Therefore, the inclination of the tone curve becomes 1 or larger for the dark to the intermediate gradations, enabling expanding the intermediate dark gradation portion and obtaining the luminance signal (Y) with the raised contrast of the intermediate dark gradation portion.

Referring to FIG. 11B, the tone curve 91 used for the darkest gradation portion is a use range extracted from the wide range tone curve 91 when the neighborhood average gradation value LPFY is 0.

From the formula (4), the point P0 which is the 0 (zero) point of the use range is 2047. Therefore, the dark side control point 92 exists at the gradation value 0 (=2047−2047) and therefore can be ignored. The light side control point 93 exists at the gradation value 2048 (=4095−2047), where the gradation value is raised by the product of 2048 and (1+GP) depending on the value of the coefficient GP. Therefore, the inclination of the gradation value of the dark gradation portion becomes 1 or larger, enabling expanding the dark gradation portion and obtaining the luminance signal (Y) with the raised contrast of the dark gradation portion.

Four different types of neighborhood average gradation values have been described with reference to FIGS. 10A, 10B, 11A, and 11B. Depending on the value of the neighborhood average gradation value LPFY, ranges of intermediate tone curves can be continuously obtained.

As described above, based on the neighborhood average gradation value LPFY, the relative position of the gradation range having a large inclination of the wide range tone curve 91 illustrated in FIG. 9 (a gradation range between the dark side control point 92 and the light side control point 93) on each tone curve is determined as illustrated in FIGS. 10A, 10B, 11A, and 11B.

In the present exemplary embodiment, as described above, a use range is extracted from the wide range tone curve 91 according to the gradation range in which the contrast correction is performed on the luminance signal (Y). Therefore, the present exemplary embodiment enables high-speed processing by using less number of circuits and calculations than with the first and second exemplary embodiments.

According to the present exemplary embodiment, a tone curve is a broken line broken at control points, i.e., a combination of straight lines. Therefore, a tone curve can be easily implemented by using a circuit which combines multipliers and an adder. Using look-up tables makes it easier to curve the tone curve. Also in this case, the inclination of the tone curve needs to be 1 or larger in each gradation portion.

Also in the present exemplary embodiment, various modifications according to the first exemplary embodiment can be employed.

Although examples of configurations for achieving one or more features of the present disclosure have been described above as exemplary embodiments, configurations for achieving the present invention are not limited to the above-described exemplary embodiments. For example, it is obvious that similar image processing to that in the above-described exemplary embodiments can be performed by using a microprocessor and a memory. Although this method is time-consuming and therefore is suitable for still images and low-resolution moving images, high-resolution moving images can also be processed as long as the microprocessor has sufficiently high processing speed.

Each of the exemplary embodiments can be widely used as an image quality adjustment apparatus or an imaging apparatus connected to a display (using liquid crystal, a plasma emission element, and an electroluminescence (EL) element), a projector, or a display apparatus.

The above-described exemplary embodiments are to be considered as illustrative in embodying one or more features of the present disclosure, and not restrictive of the technical scope of the present invention. The present invention may be embodied in diverse forms without departing from the technical concepts or essential characteristics thereof.

According to the configuration of the present exemplary embodiment, it is possible to restrain image quality degradation when an image in which a wide dynamic range is assumed is displayed with a narrow dynamic range.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-231015, filed Nov. 26, 2015, which is hereby incorporated by reference herein in its entirety.

What is claimed is:

1. An image processing apparatus generating an image for displaying an input image with dynamic range smaller than the dynamic range of the input image by a display device, the image processing apparatus comprising:
one or more processors that operate to:
perform a first process of expanding a contrast of a light portion on the input image;
perform a second process of expanding a contrast of an intermediate portion on the input image;
perform a third process of expanding a contrast of a dark portion on the input image;
acquire gradation values of a plurality of neighborhood pixels positioned in a predetermined range from a processing target pixel of the input image; and
determine a gradation value of a pixel on a converted image corresponding to the processing target pixel by using the acquired gradation values of the plurality of neighborhood pixels, the converted gradation values output by the first process, the converted gradation values output by the second process, and the converted gradation values output by the third process.

2. The image processing apparatus according to claim 1, wherein the one or more processors further operate to:
determine use ratios of the plurality of gradation values based on the acquired gradation values of the plurality of neighborhood pixels; and
determine the gradation value of the pixel on the converted image corresponding to the processing target pixel based on the plurality of converted gradation values and the use ratios.

3. The image processing apparatus according to claim 2, wherein the one or more processors acquire an average gradation value of the gradation values of the plurality of neighborhood pixels, and
wherein the one or more processors determine the use ratios based on the acquired average gradation value.

4. The image processing apparatus according to claim 2, wherein a sum of the determined use ratios exceeds 1.

5. The image processing apparatus according to claim 1, wherein the one or more processors further operate to:
perform the third process in which a variation of a gradation value of the converted image with respect to a variation of a gradation value in a first gradation range of the input image is larger than a variation of a gradation value of the converted image with respect to a variation of a gradation value in a second gradation range of the input image, the second gradation range being higher than the first gradation range; and
perform the first process in which the variation of the gradation value of the converted image with respect to the variation of the gradation value in the first gradation range of the input image is smaller than the variation of the gradation value of the converted image with respect to the variation of the gradation value in the second gradation range.

6. The image processing apparatus according to claim 1, further comprising a memory that operates to hold conversion information in which input gradation values are gradation values in a range wider than a range of gradation values which can be taken by the input image, and
wherein the one or more processors determine the gradation value of the pixel on the converted image corresponding to the processing target pixel based on the conversion information held by the memory and the acquired gradation values of the plurality of neighborhood pixels.

7. The image processing apparatus according to claim 6, wherein the one or more processors determine a range to be used to generate the converted image from the conversion information including a wide range of the input gradation values based on the acquired gradation values of the plurality of neighborhood pixels, and determine the gradation value of the pixel on the converted image corresponding to the processing target pixel by using conversion information in the determined range.

8. The image processing apparatus according to claim 1, wherein the conversion information includes a tone curve or a look-up table for determining the gradation value of the converted image from a gradation value of the input image.

9. An image processing method for generating an image for displaying an input image with dynamic range smaller than the dynamic range of the input image by a display device, the image processing method comprising:
performing a first process of expanding a contrast of a light portion on the input image;
performing a second process of expanding a contrast of an intermediate portion on the input image;
performing a third process of expanding a contrast of a dark portion on the input image;
acquiring, in order to generate a converted image having a narrower dynamic range than an input image, gradation values of a plurality of neighborhood pixels positioned in a predetermined range from a processing target pixel of the input image; and
determining a gradation value of a pixel on a converted image corresponding to the processing target pixel by using the acquired gradation values of the plurality of neighborhood pixels, the converted gradation values output by the first process, the converted gradation values output by the second process, and the converted gradation values output by the third process.

10. The image processing method according to claim 9, further comprising:
determining use ratios of the plurality of gradation values based on the acquired gradation values of the plurality of neighborhood pixels,
wherein the gradation value of the pixel on the converted image corresponding to the processing target pixel is determined based on the plurality of converted gradation values and the use ratios.

11. The image processing method according to claim 9, further including:
performing the third process in which a variation of a gradation value of the converted image with respect to a variation of a gradation value in a first gradation range of the input image is larger than a variation of a gradation value of the converted image with respect to a variation of a gradation value in a second gradation range of the input image, the second gradation range being higher than the first gradation range; and
performing the first process in which the variation of the gradation value of the converted image with respect to the variation of the gradation value in the first gradation range of the input image is smaller than the variation of the gradation value of the converted image with respect to the variation of the gradation value in the second gradation range.

12. A non-transitory computer-readable storage medium storing a program for causing a computer to execute an image processing method for generating an image for displaying an input image with dynamic range smaller than the dynamic range of the input image by a display device, the image processing method comprising:
performing a first process of expanding a contrast of a light portion on the input image;
performing a second process of expanding a contrast of an intermediate portion on the input image;
performing a third process of expanding a contrast of a dark portion on the input image;
acquiring, in order to generate a converted image having a narrower dynamic range than an input image, gradation values of a plurality of neighborhood pixels positioned in a predetermined range from a processing target pixel of the input image; and
determining a gradation value of a pixel on a converted image corresponding to the processing target pixel by using the acquired gradation values of the plurality of neighborhood pixels, the converted gradation values output by the first process, the converted gradation values output by the second process, and the converted gradation values output by the third process.

13. The non-transitory storage medium according to claim 12, wherein the method further comprises:
determining use ratios of the plurality of gradation values based on the acquired gradation values of the plurality of neighborhood pixels,
wherein the gradation value of the pixel on the converted image corresponding to the processing target pixel is determined based on the plurality of converted gradation values and the use ratios.

14. The non-transitory storage medium according to claim 12, wherein the method further comprises:

performing the third process in which a variation of a gradation value of the converted image with respect to a variation of a gradation value in a first gradation range of the input image is larger than a variation of a gradation value of the converted image with respect to a variation of a gradation value in a second gradation range of the input image, the second gradation range being higher than the first gradation range; and
performing the first process in which the variation of the gradation value of the converted image with respect to the variation of the gradation value in the first gradation range of the input image is smaller than the variation of the gradation value of the converted image with respect to the variation of the gradation value in the second gradation range.

15. The image processing apparatus according to claim 1, wherein the one or more processors perform the first process using conversion information for the light portion,
wherein the one or more processors perform the second process using conversion information for the intermediate portion, and
wherein the one or more processors perform the third process using conversion information for the dark portion.

16. The image processing apparatus according to claim 15,
wherein the conversion information for the light portion, the conversion information for the intermediate portion and the conversion information for the dark portion are each a tone curve plotted on coordinate axes consisting of a horizontal axis representing gradation in the input image and a vertical axis representing gradation in the converted image, and
wherein the conversion information for the light portion is a tone curve projecting downward, the conversion information for the intermediate portion is a tone curve having an S shape, and the conversion information for the dark portion is a tone curve projecting upward.

17. The image processing apparatus according to claim 15, wherein the one or more processors further operate to calculate a ratio of the dynamic range of the input image to the dynamic range of the input image displayed by the display device,
wherein the conversion information for the light portion, the conversion information for the intermediate portion and the conversion information for the dark portion are each in accordance with the ratio.

18. The image processing apparatus according to claim 1, wherein the input image is an image formed based on luminance signals.

* * * * *